United States Patent [19]
Baldwin et al.

[11] Patent Number: 5,986,640
[45] Date of Patent: Nov. 16, 1999

[54] DISPLAY DEVICE USING TIME DIVISION MODULATION TO DISPLAY GREY SCALE

[75] Inventors: John Lewis Edwin Baldwin, Eastleigh; Brian Eckersley, Manchester, both of United Kingdom

[73] Assignee: Digital Projection Limited, United Kingdom

[21] Appl. No.: 08/880,318

[22] Filed: Jun. 23, 1997

Related U.S. Application Data

[63] Continuation of application No. 08/416,801, filed as application No. PCT/GB93/02129, Oct. 14, 1993, abandoned.

[30] Foreign Application Priority Data

Oct. 15, 1992 [GB] United Kingdom .................... 9221697
Dec. 9, 1992 [GB] United Kingdom .................... 9225675

[51] Int. Cl.⁶ ........................................................ G09G 5/10
[52] U.S. Cl. ............................................. 345/147; 345/89
[58] Field of Search ...................................... 345/147, 148, 345/149, 87, 89

[56] References Cited

U.S. PATENT DOCUMENTS 5,157,386 10/1992 Uchida et al. ........................... 345/147
5,189,406 2/1993 Humphries et al. ..................... 345/147
5,287,096 2/1994 Thompson et al. ..................... 345/147
5,389,948 2/1995 Liu .......................................... 345/147
5,515,076 5/1996 Thompson et al. ..................... 345/139

FOREIGN PATENT DOCUMENTS 0261896 3/1988 European Pat. Off. .
0261901 3/1988 European Pat. Off. .
9012388 10/1990 WIPO .
9209064 5/1992 WIPO .
9212506 7/1992 WIPO .

*Primary Examiner*—Dennis-Doon Chow
*Attorney, Agent, or Firm*—Lerner, David, Littenberg, Krumholz & Mentlik, LLP

[57] ABSTRACT

A display device includes a deformable mirror device wherein grey scales are displayed using a time division modulation process in which the times or sub-frame periods for which each mirror within the deformable mirror array is switched on. The device includes a selection means for ordering selected sub-frame periods or divided sub-frame periods such that the light directed from each mirror is substantially temporally balanced during each frame period of the display device and/or between consecutive frame periods.

20 Claims, 12 Drawing Sheets

CENTRE OF ILLUMINATION
(COI)

COI

COI

COI

COI

DISPLAY DEVICE USING TIME DIVISION MODULATION TO DISPLAY GREY SCALE

This is a continuation of application Ser. No. 08/416,801, filed Jun. 13, 1995 now abandoned, which is filed as PCT GB93/02129 on Oct. 14,1995.

BACKGROUND OF THE INVENTION

1. Field of the Invention

This invention relates to display devices. In particular the invention relates to display devices including an array of switchable elements, each switchable element being switchable between at least two states, the form of the image displayed by the display device being dependent on which state each switchable element is in.

2. Description of the Prior Art

Such switchable elements may take the form of light modulators which control the passage of light from a light source to the displayed image. Examples of light modulators include deflectable mirror devices as for example described in "Deformable Mirror Spatial Light Modulators" by Hornbeck, published in the Proceedings of SPIE, Vol. 1150, August 1989. Such deflectable or "deformable" mirror display devices include an array of deflectable mirror devices, each mirror device being mounted on a torsion element over a control electrode. Applying an electric field between each mirror device and the electrode causes the mirror device to pivot, thus changing the direction of light reflected from the mirror device.

Another example of a light modulator is a liquid crystal device.

Alternatively, the array of switchable elements may take the form of an array of light sources which themselves can be switched either on or off, for example, an array of light emitting diodes.

Generally such display devices are digital devices, that is each switchable element of the device is effective to switch the light passing from the element to the displayed image either "on" or "off" so as to produce either "white" or "black" pixels on the displayed image. It is, however, possible to display grey scale images by controlling the time for which each switchable element of the device is in a state such that light from the element arrives at the displayed image, and using the integrating response of the human eye of an observer who will perceive a grey scale image from the element.

An example of such an arrangement is described in GB 2014822 which discloses a display device incorporating an X-Y array of energizable light emitting devices. The display device described in GB 2014822 takes data in binary digital forms, for example via an 8 bit signal, the device being driven a line at a time in a number of periods during which the modulators may be "on" or "off". The "on"/"off" state of each pixel during each time period is determined by the state of the corresponding bit of the digital input data.

Display devices incorporating light modulators in the form of deformable mirror devices operate in an analogous manner. In deformable mirror devices, however, the entire pixel array is driven simultaneously in sympathy with the video source vertical scan rate.

The eight time periods within each display frame period are of different lengths. The length of the time period corresponding to the least significant bit (LSB) in the input signal for any particular frame is set at a predetermined value, the duration of the time period corresponding to the next to the least significant bit being twice as long as that corresponding to the least significant bit, and so on. Thus, the length of the time period corresponding to the most significant bit (MSB) for such an eight bit input signal is 128 times that corresponding to the least significant bit (LSB). Provided that all the time periods are included within a display frame period of less than around 20 msecs duration, the human eye will integrate the periods and respond as if to a single period having a level of brightness corresponding to the binary signal value. At the end of each sub-frame period corresponding to a single bit of the input signal, a resetting signal is supplied to all the elements of the array in order to switch the elements into a rest position in some systems, or into the state determined by the next bit signal.

Such display systems, using time division multiplex addressing of the switching elements at least partially to display grey scales, are used in large screen projectors. It is found however that where such large screen projectors are used to display motion video signals, there are formed bands of twinkling pixels at certain mid-grey brightness levels. Furthermore, for the same mid-grey brightness levels, the displayed image can break up into "chunky" pixels if a viewer blinks his eyes, moves his head, or waves his fingers in front of his eyes or in front of the projection lens. These effects are sometimes known as "dynamic contouring".

SUMMARY OF THE INVENTION

It is an object of the present invention to provide a display system incorporating an array of switchable elements wherein these problems are at least alleviated.

According to a first aspect of the present invention, there is provided a display system including an array of switchable elements wherein grey scales are at least partially displayed using a time division modulation process for switching each element between an "on" state in which light is directed onto a display, and an "off" state in which light is not directed onto the display, wherein each frame period of the display system is divided into sufficient of the time intervals in which each element is switched to the "on" or "off" state in order to increase the temporal balance of the light from each element.

The invention thus arises in the appreciation by the inventors that the effects defined above as "dynamic contouring" can be reduced by manipulation of the time division multiplex addressing scheme.

Thus, according to a second aspect of the present invention, a display system including an array of switchable light directing elements includes means for modifying the times for which each element directs light onto a display so as to reduce adverse effects caused by the temporal addressing of the switchable elements.

BRIEF DESCRIPTION OF THE DRAWINGS

A number of embodiments of a display system in accordance with the invention will now be described by way of example only with reference to the accompanying figures in which:

FIG. 7 illustrates a first example of a bit weight distribution scheme for use in a display system in accordance with an embodiment of the invention;

FIG. 11 illustrates a third example of a bit weight distribution scheme for use in a display system in accordance with an embodiment of the invention;

FIG. 13 illustrates a modification of the bit weight distribution scheme of FIG. 12.

DESCRIPTION OF THE DRAWINGS

Figure 1:
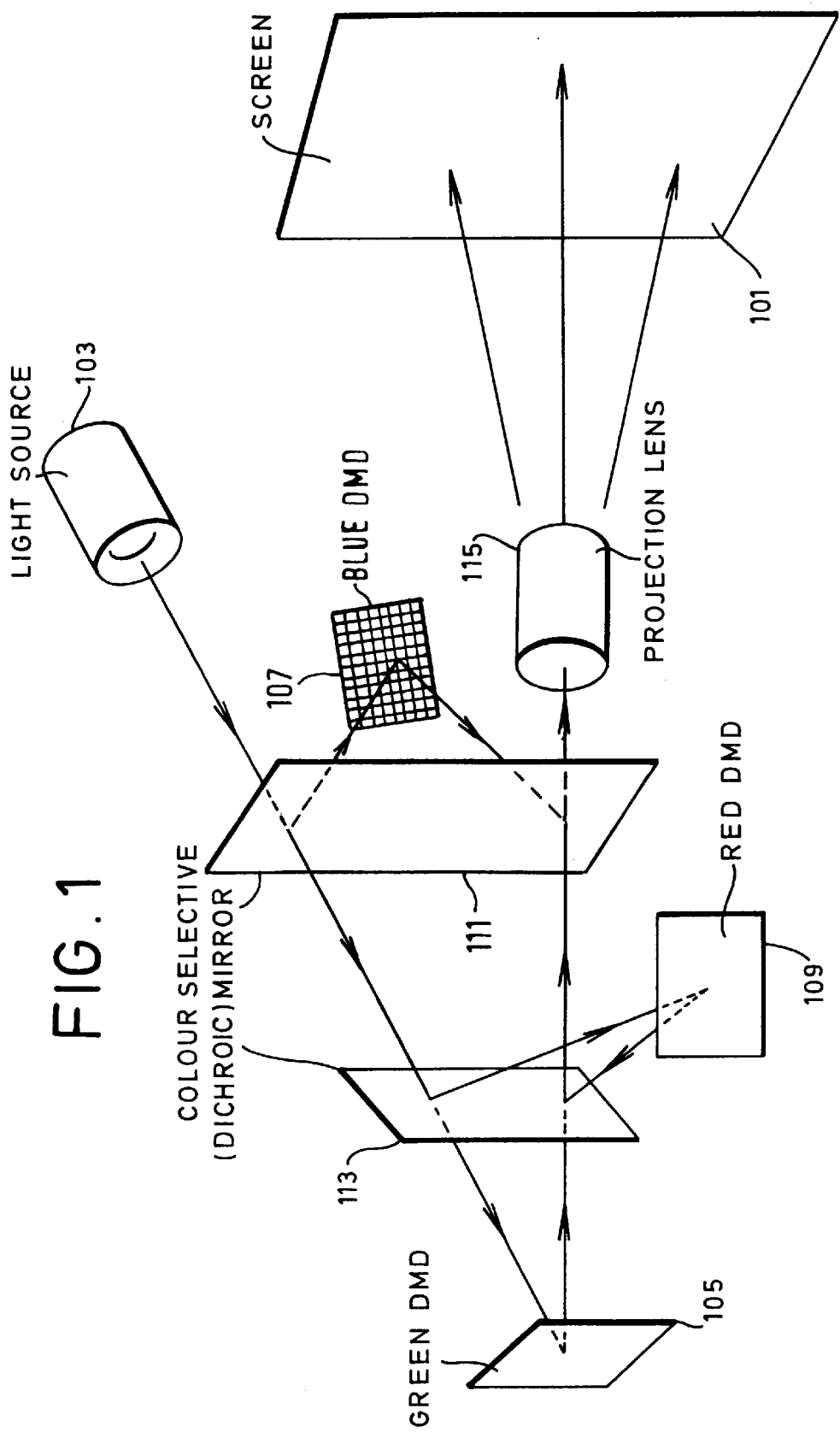
FIG. 1 is a schematic diagram of an overview of a display system of known form.

Referring firstly to FIG. 1, the particular example of a display system to be described is arranged to project a colour image onto a display screen 101. The display system includes a light source 103 which may take any suitable form, for example an arc lamp. The light source 103 is arranged such that the beam from the source is directed onto three planar deflectable mirror display devices 105, 107, 109 as will now be described.

Positioned in the light path between the light source 103 and the first deflectable mirror device 105 are two dichroic mirrors 111, 113. The first dichroic mirror 111 is designed and angled to reflect blue light onto the second planar deflectable mirror display device 107 and transmit all other incident light. The second dichroic mirror 113 is designed and angled so as to reflect red light onto the third planar deflectable mirror device 109 and transmit the remaining green component of the light from the source 103 onto the first deflectable mirror display device 105.

The three deflectable mirror devices 105, 107, 109 are arranged to be capable of reflecting the three colour components of the beam from the source 103 so as to direct the spatially modulated beam through a projection lens 115 onto the display screen 101.

Figure 2:
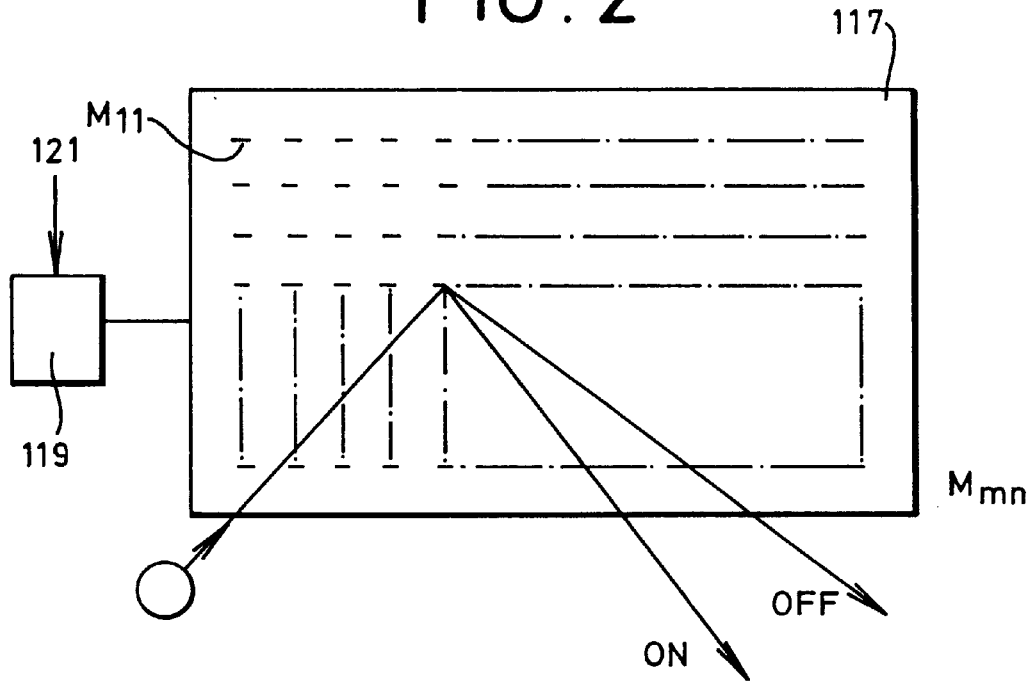
FIG. 2 is a schematic diagram of a spatial light modulator array incorporated in the system of FIG. 1.
Figure 3:
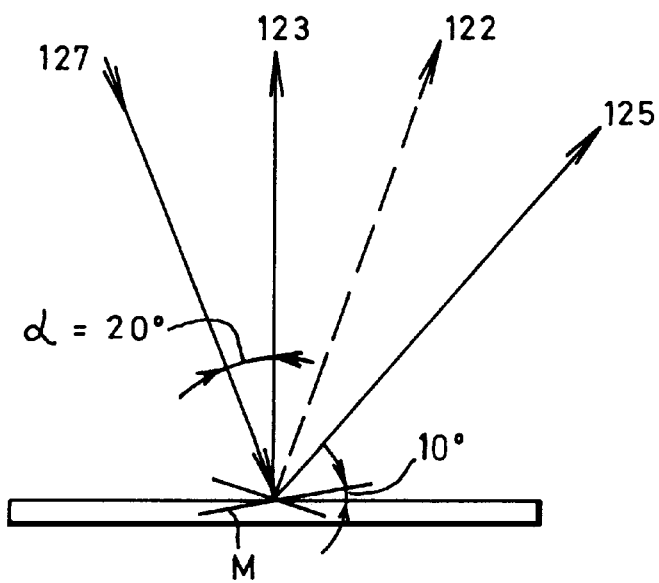
FIG. 3 illustrates the illumination of a mirror device in the array of FIG. 2.

Referring now also to FIGS. 2 and 3, each deflectable mirror device (DMD) 105, 107, 109 comprises an array of m×n deflectable mirror devices, typically 768×576 mirror devices for a low resolution display system or 2048×1152 mirror devices for a high resolution display system. Each array 117 is connected to a driver circuit 119 which receives an electronic colour video signal from the control circuit indicated generally as 121, and addresses each of the mirror devices $M_{11}$–$M_{mn}$ as, for example, described in the applicant's earlier International Patent Application, PCT/GB92/00002 dated Jan. 4th 1992 (incorporated herein by reference). Dependent on the applied address signal, each mirror device M is caused to take one of two different positions corresponding to an "on" state in which the reflected light is directed in a first path 123 and an "off" state in which the reflected light is directed in a second path 125. The second path 125 is chosen such that light reflected along this direction is directed away from the optical axis of the display system and thus does not pass into the projection lens 115.

Thus, each DMD array 117 is capable of representing a two dimensional image, those mirror devices M which are tilted to the "on" state appearing bright and those which are tilted to the "off" state appearing dark. By varying the ratio of the "on" period to "off" period, that is by a temporal modulation technique, grey scale can be achieved as will be described in more detail hereafter.

Turning now particularly to FIG. 3 the angle through which each mirror device M is deflected between the "on" state and the "off" state is relatively small. Thus in order to achieve good discrimination between the "on" and "off" states the incident light beam 127 from the source 103 is directed towards each spatial light modulator 105, 107, 109 at an angle measured from the normal to each device of around 20°.

When an individual mirror device M is lying parallel to the plane of the array 117, the incident beam 127 is reflected at a corresponding angle of 20° to the normal along an "off" path 122 into a beam dump (not shown). When the control signal from the driver circuit 119 sets the mirror device M into a first deflection state at a first angle to the plane of the array 117, the incident beam 127 is reflected along the direction 125 in a further "off" path into the beam dump. When the control signal from the addressing circuit 119 sets the mirror device M into a second deflection state at a second angle to the plane of the array 117, the incident beam 127 is reflected out along the normal to the array along the "on" path 123.

Figure 4A:
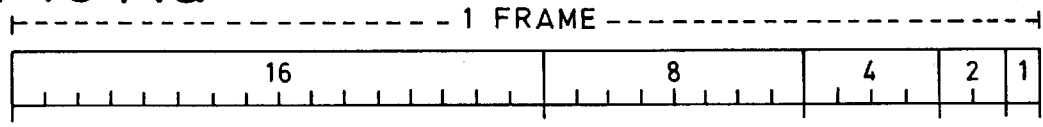
FIGS. 4a–4e illustrate five examples of a known time division multiplex address scheme for achieving grey scales in the system of FIG. 1.
Figure 4B:
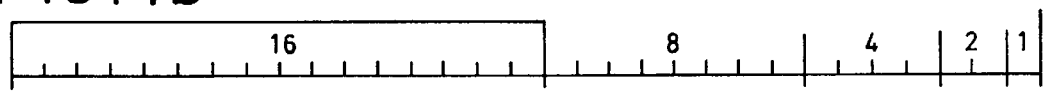
Figure 4C:
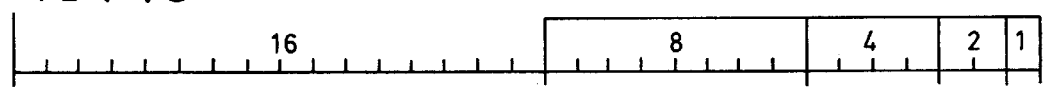

Referring now to FIGS. 4a–4e, these Figures illustrate the time division multiplex address sequence of each of the mirror devices M of the DMD array 117 which enables grey scales to be displayed on the screen 101. For the sake of simplicity, the example shown in FIGS. 4a–4e corresponds to a five bit input video signal. Thus each FIG. 4a–4c represents a time frame of a particular mirror device M which is divided into thirty-one equal time intervals, the horizontal direction thus representing a time axis.

FIG. 4a corresponds to the situation where the mirror device M is arranged such that maximum brightness is displayed on the display screen 101 for the duration of a frame period of the display device. Thus, the mirror device M is switched to the "on" state for a duration of sixteen time units (corresponding to the MSB), eight time units, four time units, two time units, and finally one time unit, (corresponding to the LSB). Thus the integrated brightness level for the particular mirror device M in array 117 is thirty-one units.

This can be contrasted with the situation shown in FIG. 4b in which the mirror device M is switched to the "on" state only for the duration of the time period corresponding to the MSB during a single frame period of the display device.

Thus, the integrated brightness of the mirror device M for the frame period is sixteen units.

Similarly FIG. 4c illustrates the situation where the mirror device M is switched to the "off" state for the time interval corresponding to the MSB, and switched to the "on" state for the rest of the frame period. Thus, the integrated brightness of the mirror device M for the frame period is fifteen units.

Figure 4D:
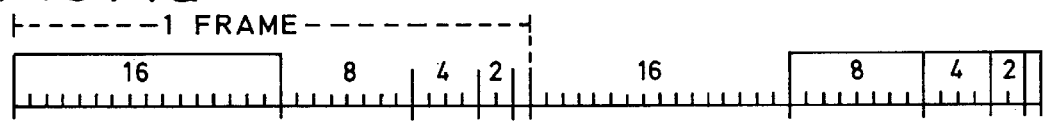

Turning now to FIG. 4d, this Figure illustrates two consecutive frame periods for a single mirror device M, and thus is to a different time scale from FIGS. 4a–4c. In this particular example, the sequence illustrated in FIG. 4b is followed by the sequence illustrated in 4c. Thus, in the example shown in FIG. 4d, the second half of the first frame period and the first half of the second frame period are both dark corresponding to an "off" state of mirror device M. This results in a time interval of one frame period when no light appears on the display screen 101 for the pixel corresponding to mirror device M. It has been appreciated by the inventors that this will manifest itself as a dark flash on the display screen 101 which will be discernible to an observer.

Figure 4E:
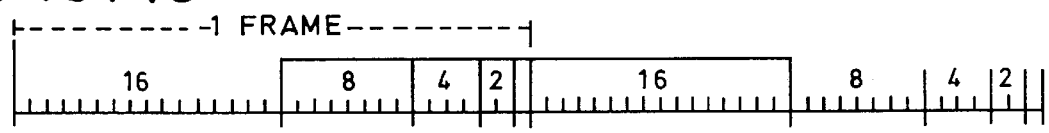

The situation illustrated in FIG. 4e also shows two consecutive frame periods for a single mirror device M, and is thus shown with the same horizontal time scale as that of FIG. 4d but with a reversed frame sequence. In this particular example there is a total frame period consisting of the second half of the first frame period and the first half of the second frame period when the display screen is continuously illuminated. It has been appreciated by the inventors that this will appear to an observer as a white flash on the display screen 101.

If the drive signal to the mirror device M fluctuates between the bit sequences of FIG. 4d and 4e due to, for example, video quantisation noise, then that pixel will appear to twinkle in sympathy with the noise, that is the phenomenon known as "dynamic contouring". Thus, it has been appreciated by the inventors that at certain mid-grey brightness levels, situations of the type illustrated in FIGS. 4d and 4e will give rise to twinkling pixels in the projected image on the screen 101. Furthermore, this video noise will also result in quantisation time jitter of the critical bit transitions within the analogue to digital converter used to process the video input signal such that the twinkling pixels spread over a distinct band.

Figure 5:
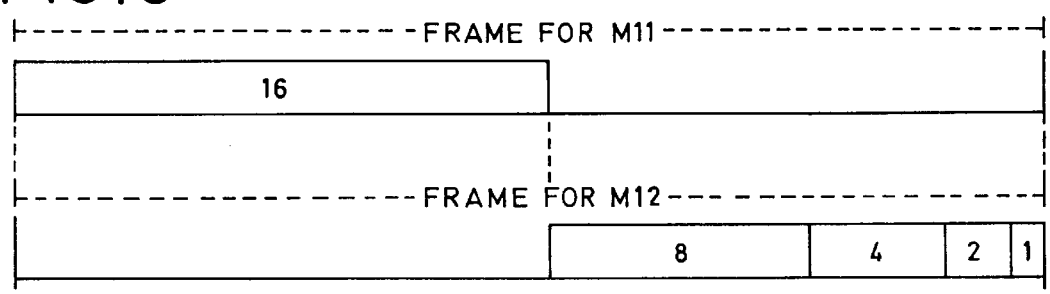
FIG. 5 illustrates an example of a known time division multiplex address scheme for two adjacent mirror devices in the arrays incorporated in the display system of FIG. 1.

It has also been appreciated by the inventors that the situations depicted in FIGS. 4d and 4e can also give rise to apparent "dynamic contouring" of the image when an observer blinks his eyes, moves his head, or waves his fingers in front of his eyes or in front of the projection lens 105. This can be seen with reference to FIG. 5 which illustrates a single frame time period for each of two adjacent mirror devices $M_{11}$ and $M_{12}$, the horizontal scale thus being different to that of FIG. 4a–e. The first mirror device $M_{11}$ is arranged such that the MSB only is "on", all the other bits being off. In the second mirror device $M_{12}$, the MSB is "off" with all the other bits being "on". Thus, it will be seen that the image pixel formed from the light from $M_{11}$ will arrive on the display screen 107 half a frame period before the image pixel formed from the light from $M_{12}$.

If the head of the observer is moving, or the observer's eyes scan across the projected image on the display screen 101, for example when following a moving object on the displayed image, the two pixels corresponding to the light from mirror devices $M_{11}$ and $M_{12}$ will appear to move relative to the background and hence relative to each other. This leads to the pixel corresponding to light from the "later" addressed mirror device $M_{12}$ appearing to move in the opposite direction to the scanning direction of the observer's eyes, whilst the pixel corresponding to light from the earlier addressed mirror device $M_{11}$ will appear to move in the same direction as the scanning direction of the observer's eyes. Thus, if the direction of movement of the observer's eyes is in the direction from the mirror device $M_{11}$ to the mirror device $M_{12}$, the apparent displacement of the two pixels will cause the pixels to appear to overlap, leading to an apparent bright up of the displayed image at that point on the display screen 101.

Conversely, where the direction of movement of the observer's eyes is in the opposite direction, that is from the mirror device $M_{12}$ to the mirror device $M_{11}$ the two pixels will appear to separate leading to an apparent darkening of the image at the corresponding point on the display screen 101. This effect will follow the pixels corresponding to major transitions in the displayed image much like contour lines on a map. Because these contour lines are not smooth, the apparent relative movement of the pixels will give the impression of a coarse pixel structure at these transition points to give an effect similar to that of inadequate display resolution.

Thus, it has been appreciated by the inventors that the bit transition "dynamic contouring" effects experienced in time division addressed optical modulators arise as a direct result of a temporal displacement of the bit pattern between adjacent display frames, or between adjacent pixels when the highest significant active bit turns "on" or "off". Furthermore, since the effect of the temporal shift between adjacent display frames is a unipolar fluctuation in light output, no matter how much filtering is introduced by the observer's eye, the total disturbance energy cannot be reduced but only spread over a longer time interval.

The only way that this "dynamic contouring" due to bit transitions can be reduced is either to eliminate or to minimise such temporal shifts in the bit pattern at the critical bit transitions. This is difficult to achieve completely for time division multiplex addressed display systems as temporal displacements are intrinsic to their operation. However, the problems can be alleviated if the unipolar disturbance resulting from the temporal shift can be converted to a bipolar disturbance (as will be illustrated with reference to FIGS. 8 and 9), and by maximising the frequency and minimising the amplitude content of the disturbance (as will be illustrated with reference to FIGS. 10, 11, 12 and 13).

There now follow examples of modified time multiplex addressing schemes used in a display system in accordance with the invention, which have been designed in order to implement the elimination or minimisation of temporal shifts in order to alleviate the problem of display flicker and "dynamic contouring".

Turning now to FIGS. 6a–6e these figures illustrate modified versions of the bit weight sequences illustrated in the prior art arrangements of FIGS. 4a–4d used in a display device in accordance with the invention.

Figure 6A:
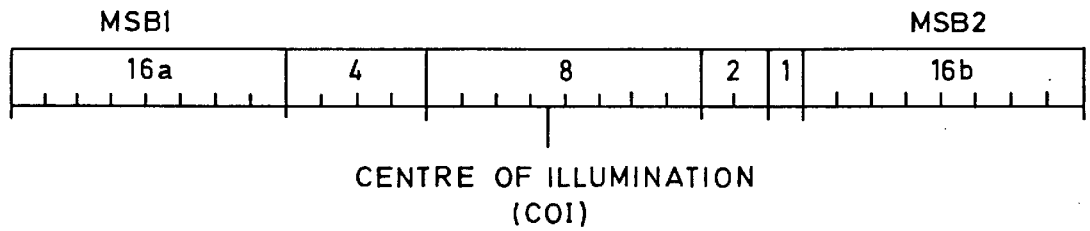
FIGS. 6a–6e illustrate five examples of a modified time division multiplex address scheme used in a display system in accordance with an embodiment of the invention.

FIG. 6a illustrates the situation where only the MSB of 16 time units is split into two part sub-frames MSB1 and MSB2 each of 8 time units duration and labelled as 16a and 16b. A centre of illumination (COI) can be defined for the display frame period, this occuring at the centre of the frame period. A qualitative analysis of the benefit of the scheme can then be obtained by considering the "moments" of the various bit weights about the centre of illumination in analogy to dynamic balancing in a mechanical system. As both MSB1 and MSB2 will correspond to the particular mirror device M either being either "on" or "off", it will be seen that the individual moments will be equal in magnitude but opposite in sign. Thus, the contribution from these two part sub-frame periods to the moment of illumination will be zero. The second longest sub-frame period, which is eight units long, is placed as close as possible to and symmetrically about the centre of the frame period in order to minimize its contribution to the moment of illumination. The remaining sub-frames of 4, 2 and 1 are positioned as symmetrically as possible about the centre of illumination in order to minimise changes in the moment of illumination of the frame for the various possible combinations of seven units (4+2+1), eight units (single 8 sub-field), fifteen units (8+4+2+1), sixteen units (16a+16b), twenty-three units (16a+16b+4+2+1), and twenty-four units (16a+16b+8).

Figure 6B:
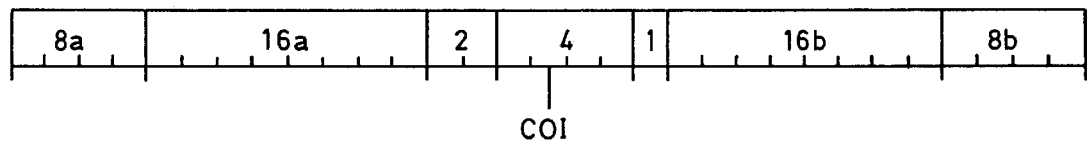

FIG. 6b shows a modification of the scheme of FIG. 6a in which the second most significant bit sub-frame of eight units is also divided into two parts 8a and 8b, each of four units duration. If the centres of the part sub-frames 16a and 16b are separated by half a frame period as shown in FIG. 6b, then at the sixteen unit mid brightness level, the flicker fundamental frequency component of the light output at the display frame rate is eliminated, and hence any perceived display flicker will be minimised.

Figure 6C:
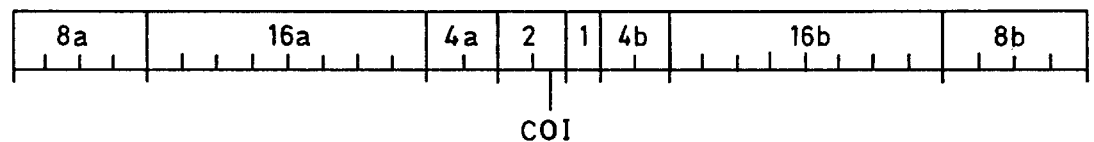

Turning now to FIG. 6c, in this bit weight distribution scheme the three most significant bits are each split into equal parts. Thus, the sixteen unit sub-frame, the eight unit sub-frame and the four unit sub-frame are all divided into parts 16a and 16b, 8a and 8b, and 4a and 4b respectively. As the part sub-frames 16a and 16b already have the optimum position as shown in FIG. 6b, the part sub-frames 4a and 4b are placed adjacent to these part sub-frames, but towards the centre of the display frame period.

Figure 6D:
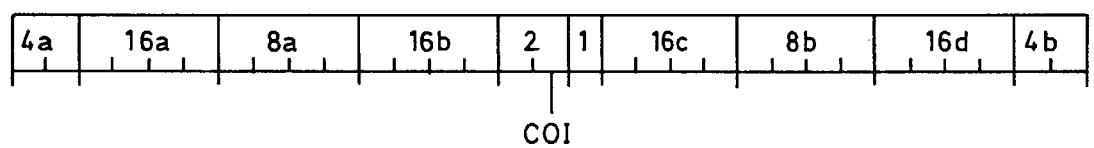

Turning now to the bit weight distribution scheme of FIG. 6d, this scheme shows the MSB being split into four equal part sub-frames, each of four units duration, that is 16a, 16b, 16c and 16d. The next two most significant bits are each split equally into two part sub-frames 8a and 8b, and 4a and 4b respectively. In this particular scheme the MSB part sub-frames 16a, 16b, 16c and 16d are spaced by a quarter of a frame period. This not only removes the fundamental sixteen unit flicker component but the second harmonic as well. The part sub-frames 8a and 8b are placed half a display frame period apart such that the fundamental flicker components at the eight unit brightness level is also eliminated. This leaves two gaps at each end of the frame period where the part sub-frames 4a and 4b fit in symmetrically.

Figure 6E:
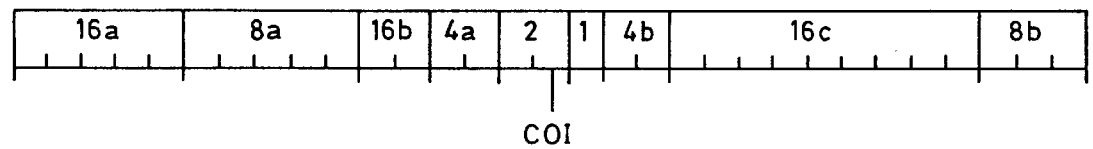

Turning now to FIG. 6e, this figure illustrates a bit weight distribution scheme in which unequal bit splitting is employed. In this scheme MSB is split into three part sub-frames, 16a of five units duration, 16b of two units duration and 16c of nine units duration. The next most significant bit is split into two part sub-frames 8a of five units duration and 8b of three units duration. The third most significant bit is split into two equal part sub-frames 4a and 4b each of two units. This figure thus illustrates a bit weight distribution scheme in which the sub-frames may be divided into an uneven number of part sub-frames of unequal duration, It can be shown, however, that the address scheme illustrated in FIG. 6e does not give as good control of the centre of illumination as that shown in FIG. 6d.

Figure 7:
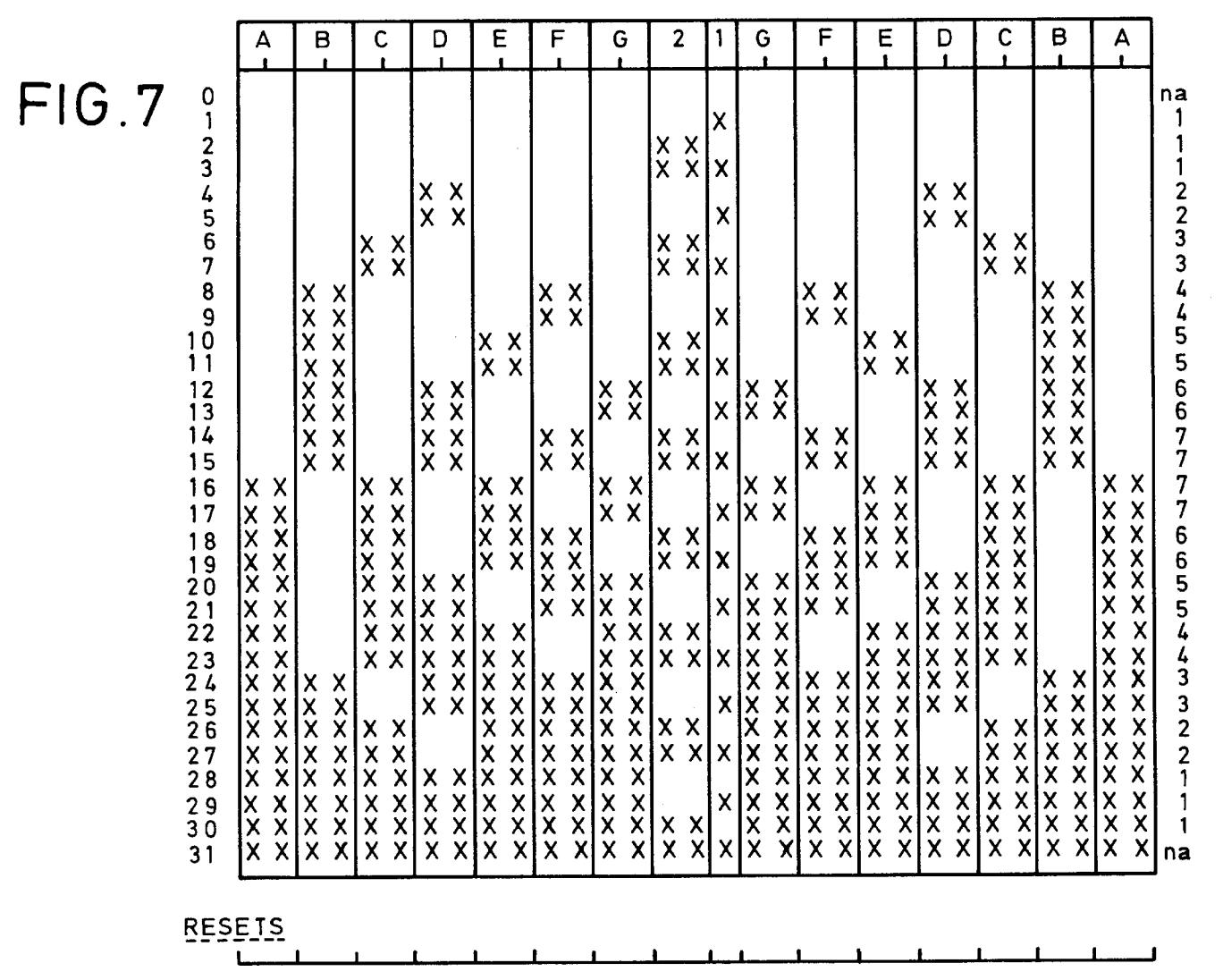

Referring now to FIG. 7, this figure illustrates a bit weight distribution scheme in which the effect of flicker is minimised. As shown in this figure, the MSB is split into eight equal part sub-frames, the next MSB into four equal part sub-frames, and the next MSB into two equal part sub-frames. Thus the maximum part sub-frame duration is now two units such that the display frame is divided into fourteen equal part sub-frames (A–G) of two units duration, one sub-frame of two units duration and one sub-frame of one unit duration to make a total of 31 units as before.

The left hand vertical column in FIG. 7 represents increasing levels of display brightness during a single frame between the minimum of zero and the maximum of thirty one units. The presence of an X in a part sub-frame indicates that the corresponding mirror device M is switched to the "on" state at that particular time, lack of an X indicating an "off" state. The timing of the reset pulses for the mirror devices in the DMD array 117 is also shown in the figure, it being apparent from FIG. 7 that reset pulses must be applied every two units to prepare the mirror devices M for their next orientation state.

The purpose of the scheme illustrated in FIG. 7 is to spread the periods during which the mirror device M is "on" evenly throughout the frame period. However, since thirty-one is a prime number, the spreading can never be perfect. It can be seen that for levels of illumination of 0–3 units and 28–31 units, even spreading of the illumination throughout the frame period does not occur. However, at these illumination levels, disturbance levels will be small and hence display artefacts will be much less apparent. For illumination levels 4 and 5, and 26 and 27, it can be seen that whilst the moment of illumination is greater, the fundamental disturbance frequency component has doubled to the second harmonic of the display cycle frequency. Similarly, for the other illumination levels, whilst the moment of illumination increases, so also does the fundamental light output disturbance frequency for each illumination level, this being shown by the figures in the right hand column of FIG. 7.

It will be appreciated that by use of a bit weight distribution scheme as is shown in FIG. 7, the one to one correlation between the video input signal and the address signals to the DMD array 117 has been removed other than for the LSB, and the next least significant bit. This can be accommodated by use of a suitable sequencer incorporating, for example, a ROM to effect the required bit conversion. Suitable apparatus will be described hereafter with reference to FIGS. 14, 15 and 16, FIG. 7 effectively acting as a truth table for programming the ROM.

It will be seen that the scheme illustrated in FIG. 7 is designed to reduce the effect of flicker caused by the effects of bit weight distribution within a single frame of the display system. Now, since the time division modulation information is received by the observer as a continuous stream, consideration must be given not only to the effects of bit weight distribution within a single display frame but also to the effects of moving from one display frame to the next. The effect of transitions between consecutive frames of the display system can be examined by computer simulation using a sliding window aperture function on the time division modulation serial data stream so as to simulate the integrating effect of the observer's eye. The variation in the mean value within the window, as the window moves along the bit sequence, will then be a measure of the light output disturbance as perceived by the observer. This will include flicker and other components in addition to the disturbances producing "dynamic contouring". Choosing a rectangular window aperture function of duration equal to the display frame period, whilst not fully representing the behaviour of the eye, does, however, simulate with maximum clarity the "dynamic contouring" disturbances by only taking into account differences between adjacent display cycles.

FIGS. 8 and 9 illustrate the results of applying such a sliding window aperture function to the MSB and the next most significant bits i.e. MSB-1 bit transitions. FIG. 8 shows the results for the bit sequence of FIGS. 4d and 4e, whilst FIG. 9 shows the result of a modified bit sequence used in a display device in accordance with the invention. In FIGS. 8 and 9 the MSB is denoted by "M", the remaining LSBs are denoted by "L" and the MSB-1 is denoted by "H".

Figure 8A:
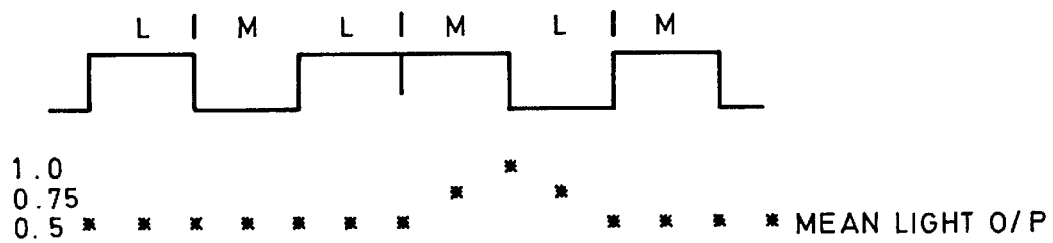
FIGS. 8a–8d illustrates an example of a computer simulation of the light output from a single pixel resulting from a prior art display system.

Consider in the first instance a sliding rectangular window sampling a sequence starting with the MSB and progressing to the LSB as shown in FIG. 8a. When the light output increases by one LSB to turn all the LSBs "off" and the MSB "on", that is the situation illustrated in FIG. 4e, it can be seen from FIG. 8a that the resultant increase in light output from a given mirror device M is of a unipolar triangular form.

Figure 8B:
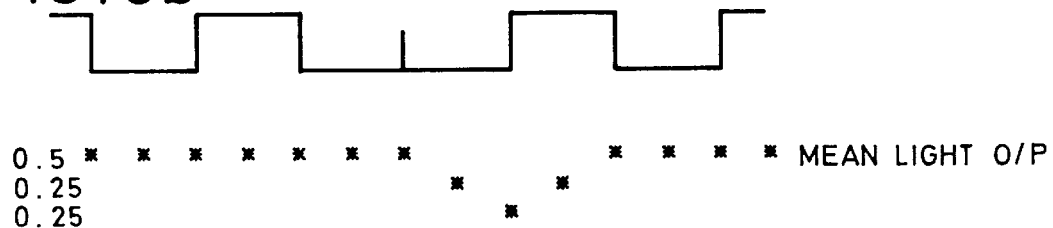

Similarly, for a decrease of one LSB as shown in FIG. 8b, that is the situation illustrated in FIG. 4d, the resulting decrease in light output is also of a unipolar triangular form.

Figure 8C:
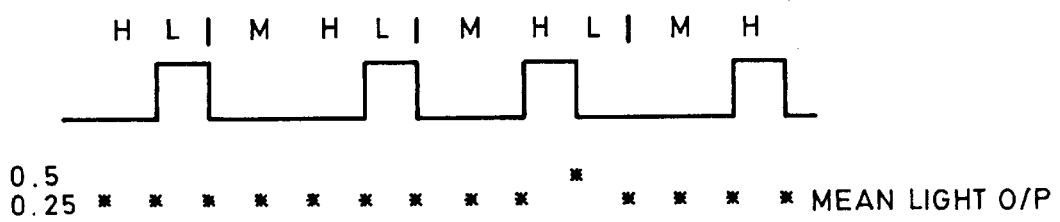

FIG. 8c illustrates the equivalent situation for the MSB-1 bit transition when an increase of one LSB turns all the LSBs "off" and the MSB-1 "on", the MSB being permanently "off". The disturbance in light output is also of a unipolar triangular form giving an increase in light output for the up transition.

Figure 8D:
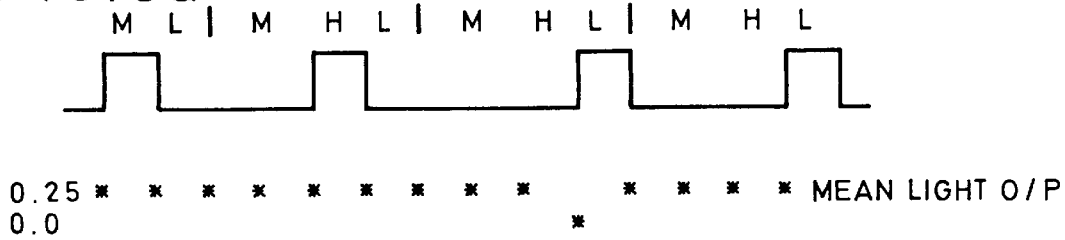

FIG. 8d illustrates the corresponding situation for 8d illustrates the corresponding situation for a decrease of one LSB showing the corresponding unipolar triangular decrease in light output.

Thus, from FIGS. 8a–8d it can be seen that for a given bit transition, the resultant disturbance in light output is of unipolar triangular form, the amplitude and duration of the disturbance increasing in proportion to the highest significance bit change transition between each pair of consecutive frames. It can also be seen that the disturbance peak amplitude is equal to the weight of the highest significance bit change, and that the duration of the disturbance is twice the bit display interval for the same significance bit.

Figure 9A:
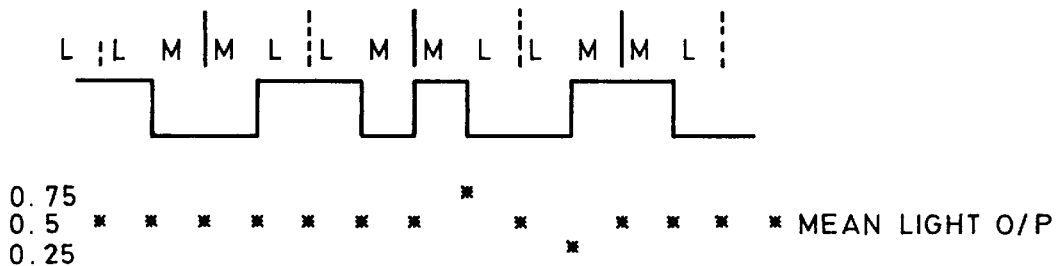
FIGS. 9a–9d illustrates an example of a computer simulation of the light output from a single pixel resulting from a modified display system in accordance with an embodiment of the invention.
Figure 9B:
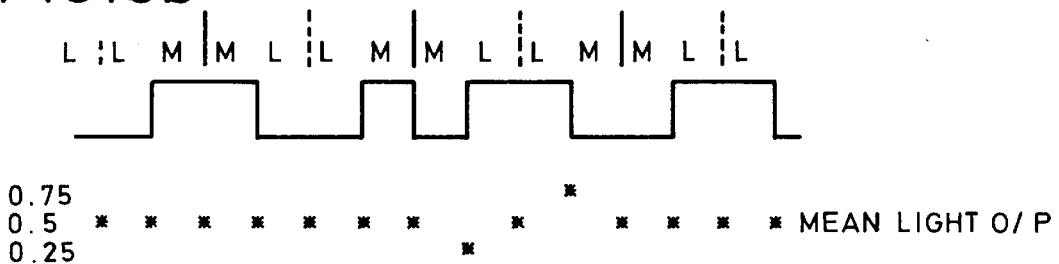

FIGS. 9a–9d illustrate the effects of bit splitting on the bit sequences of FIGS. 8a–8d when the part sub-frames of the split bits are positioned symmetrically about the centre of the display frame in a display system in accordance with the invention. FIGS. 9a and 9b show that in the case of MSB splitting, the unipolar disturbances of FIGS. 8a and 8b have been converted to a bipolar disturbance with the disturbance peak amplitudes halved, and the phase of the disturbance cycles reversing between the up and down transitions. The durations of the disturbances are, however, unchanged from that of FIG. 8a.

Figure 9C:
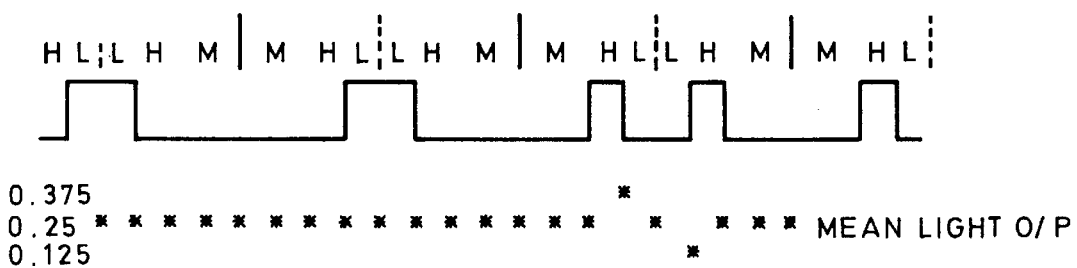
Figure 9D:
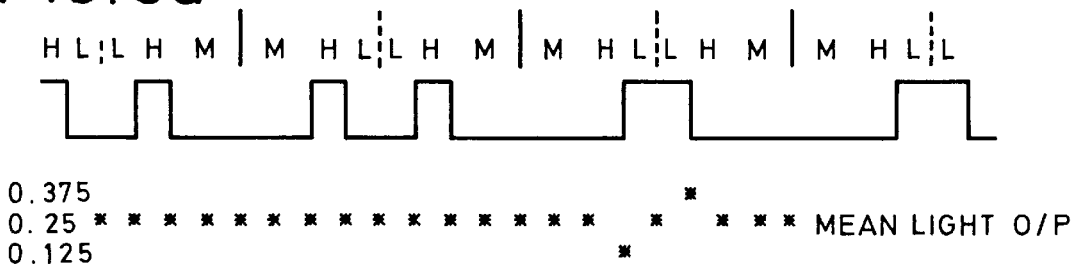

Similarly, FIGS. 9c and 9d show that in the case of the MSB-1 transition, the unipolar disturbances of FIGS. 8c and 8d are converted to a single cycle bipolar disturbances of half the peak amplitude, with a phase reversal between up and down transitions. Again, the disturbance durations are unchanged.

It can be shown that splitting the bit display intervals still further reduces both the amplitude of the disturbances and the duration of the disturbances.

In general, for a given highest significant bit change, the disturbance peak amplitude is given by (bit weight)/N, and the duration of the disturbance is given by (2*bit interval)/N where N is the bit splitting factor. Whilst, in principle, odd values of N can be employed, distributing the resultant part sub-frames poses additional problems. Furthermore, whilst is it not essential, implementation can be simplified by restricting N to binary multiples.

Defining the disturbance energy as the area under the disturbance waveforms of FIGS. 8 and 9, it can be shown by applying the sliding window technique used to generate FIGS. 8 and 9, that for minimum energy, the bit sequence must have any non-split bits in the centre of the display frame, and that the display frame should start and end with the split MSB intervals. Also, the significance of the split bits must decrease uniformly towards the centre of the display cycle. It can also be shown that placing the highest significance non-split bit at the centre of the display cycle results in that bit behaving as though it had been split, but at the expense of the next lowest significance bit having a higher disturbance energy.

Figure 10:
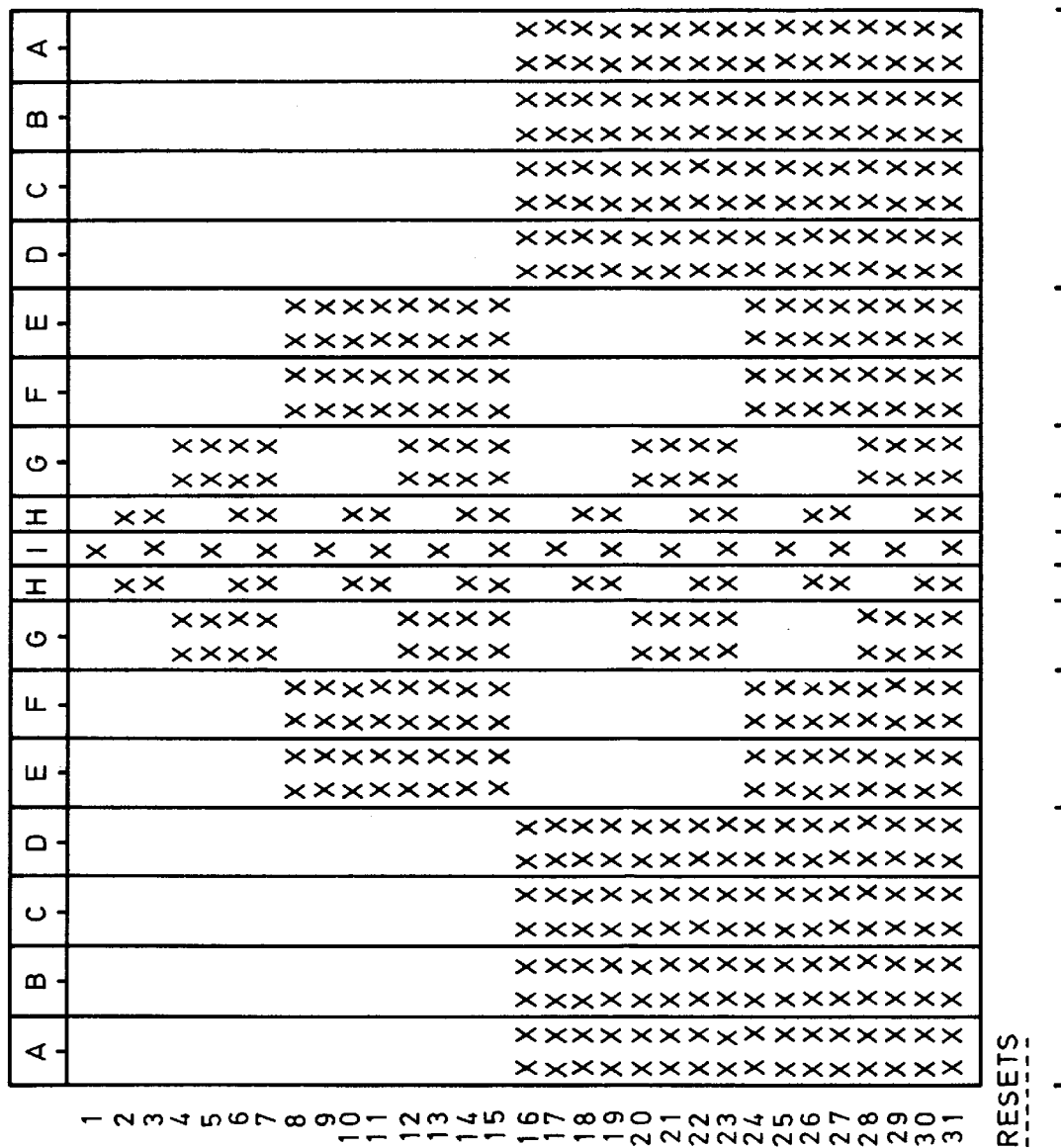
FIG. 10 illustrates a second example of a bit weight distribution scheme for use in a display system in accordance with an embodiment of the invention.

Disturbance energy considerations indicate that it is only the top four or five most significant bit weights that give rise to observable bit transition contouring on the displayed image. This is illustrated in FIG. 10 for simple bit splitting having a maximum splitting factor N of two, and for which the LSB may be considered as all the remaining unsplit bit weights with the highest order unsplit bit located at the centre of the display frame.

Generally, the light output change between adjacent frames for a single mirror device M or between two adjacent mirror devices can be any value from zero to peak white. Obviously, for changes of zero illumination or the maximum peak white illumination, contouring is not a problem since it either does not occur or is totally masked by the step brightness change. However, a step change of a single LSB resulting in an MSB change can have a pronounced dynamic contouring effect.

Ideally but not necessarily, because of the random variation of step brightness changes in a real image, the allocation of the individual bit intervals within the display cycle should be carried out on a dynamic basis so as to minimise the amount of "dynamic contouring" generated by changes in illumination level between adjacent time frames. This dynamic allocation will need to take into account such factors as the highest significance bit change, change step size, and permissible degree of bit splitting.

It has been shown with reference to FIGS. 8 and 9, that the effects of contouring due to a single LSB step change in brightness decrease with decreasing highest significance bit change. It will be appreciated, however, that the "dynamic contouring" annoyance level is strongly influenced by the total number of bits changing, the degree of bit splitting, and by how these bits are distributed within the display cycle, all these factors affecting both the amplitude and frequency of the disturbances.

Defining a "dynamic contouring annoyance factor" as the product of the peak disturbance amplitude and the disturbance duration, then the absolute "dynamic contouring" disturbance will vary as the square of the highest significance bit weight change. However, expressed as a fraction of the mean light output, the contouring disturbance will only vary in proportion to the highest significance bit weight change. Thus only the higher order bits should require splitting in order to reduce "dynamic contouring" effects.

In the case of changes in light output of greater than one LSB steps, the masking effect of the change on "dynamic contouring" will increase with increasing step size. Generally peak contouring disturbance amplitudes up to at least the change step size will be masked by the step change in light output. This masking effect will be further increased by reduction in the "contouring annoyance factor" brought about by bit splitting.

As explained above, the peak disturbance amplitude for a sliding window aperture equal to the display cycle period is proportional to the bit weight divided by the bit splitting factor N, then the effects of "dynamic contouring" will be masked for step brightness changes of this level or greater. The higher the bit splitting factor, the lower will be the peak contouring disturbance amplitude and hence the smaller the step change in light output to mask it.

Figure 11:
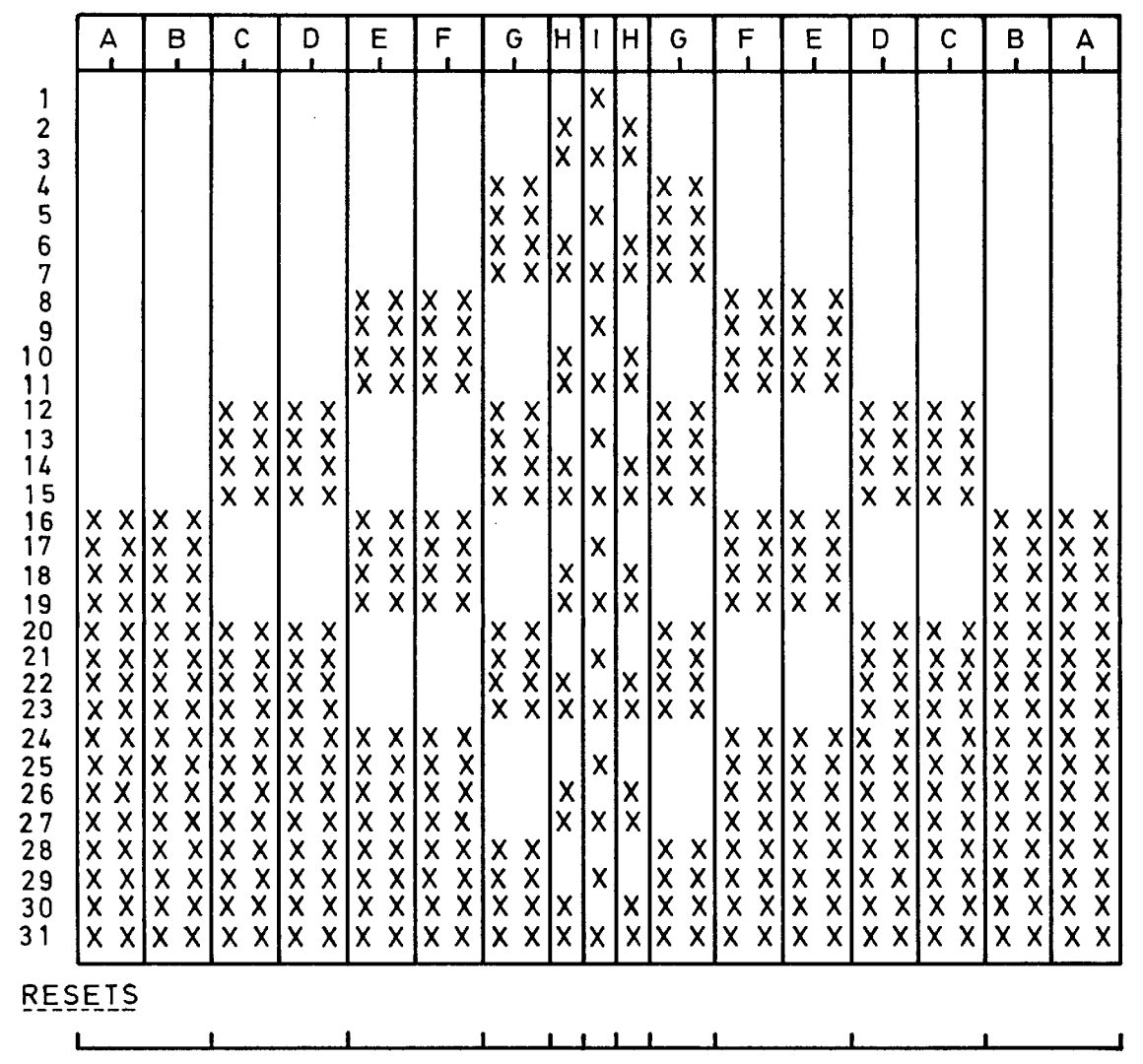
Figure 12:
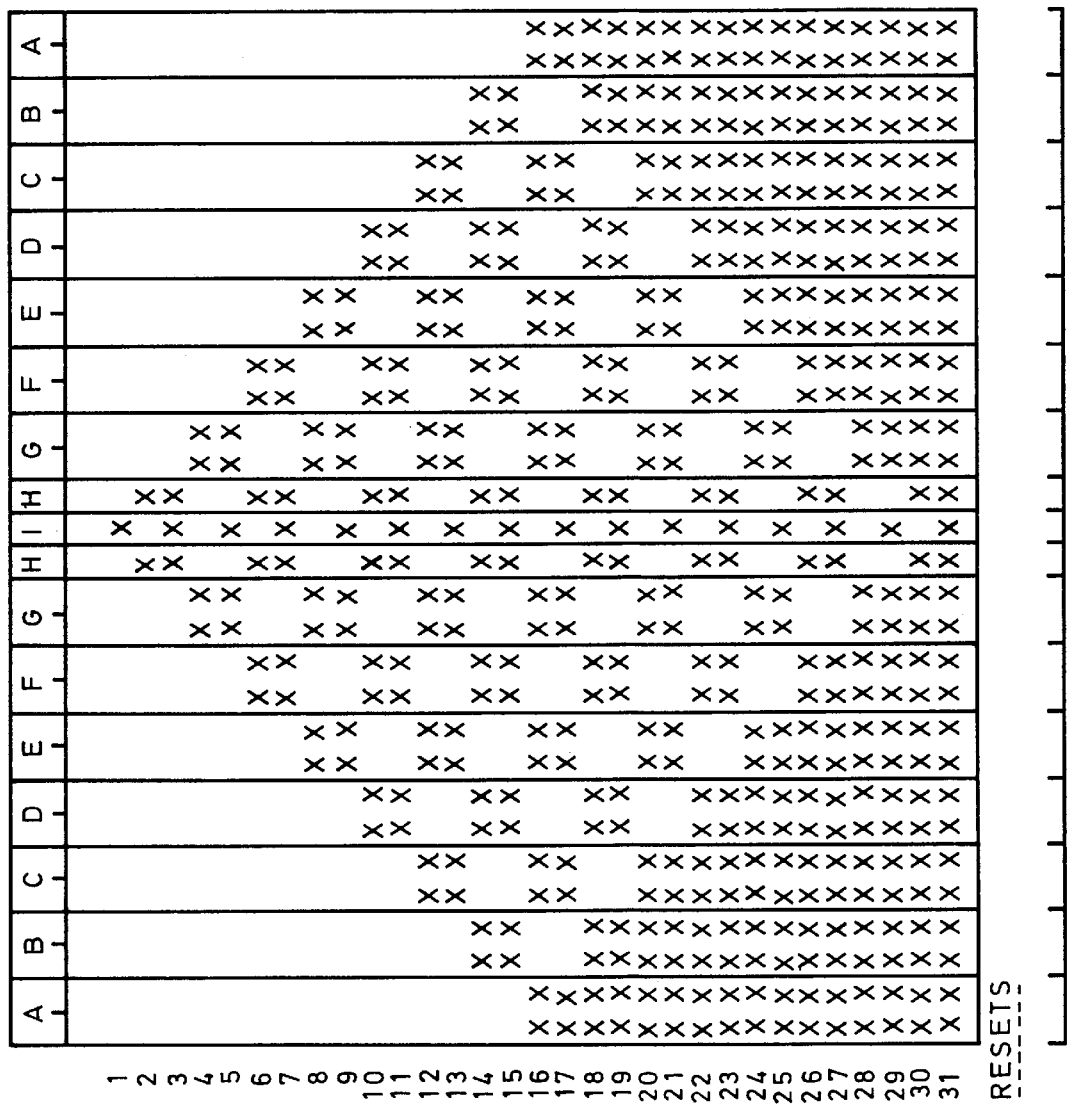
FIG. 12 illustrates a fourth example of a bit weight distribution scheme for use in a display system in accordance with an embodiment of the invention.
Figure 13:
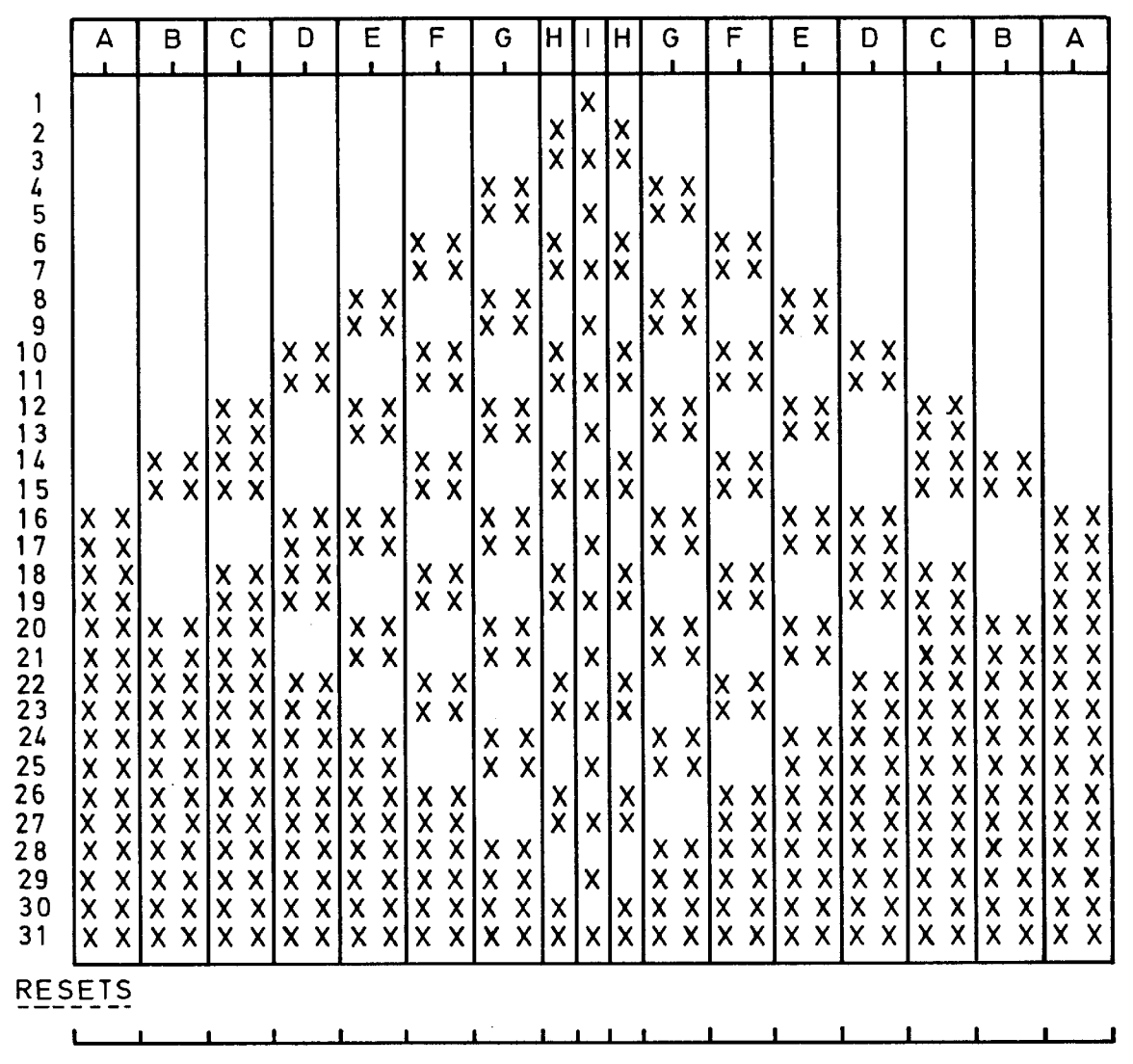

By way of example, consider FIGS. 11–13. FIG. 11 shows one possible dynamic bit splitting sequence in which the MSB has been split into four equal part sub-frames, the other split bits being split into two equal part sub-frames. The positions of the part sub-frames within the display cycle are allocated dynamically with changes in brightness level according to the truth table of FIG. 11. Thus, disturbances are now limited to the equivalent of those generated by the MSB split into four, with the peak disturbance amplitude being reduced by a factor of two over the peak disturbance amplitude of FIG. 10. Much of the MSB disturbance energy has now moved from the fundamental display cycle frequency to the second harmonic of the display frame rate compared to the FIG. 10 MSB bit transition. This will result in a disturbance energy reduction factor of between two and four depending on the amount of residual disturbance energy remaining at the fundamental frequency. The MSB-1 transition energy remains as for FIG. 10.

FIG. 12 shows a further possible dynamic bit splitting sequence in which the MSB has been split into eight equal part sub-frames, the MSB-1 into four equal part sub-frames, and the remaining split bits into two equal part sub-frames. These part sub-frames are then positioned dynamically within the display cycle according to the truth table of FIG. 13. Thus disturbances are now limited to the equivalent of those generated by the MSB split into eight for which the peak disturbance amplitude is reduced by a factor of four over that of FIG. 10. Much of the MSB disturbance energy has now moved to the fourth harmonic of the display rate FIG. 10 MSB bit transition. This will result in a disturbance energy reduction of between four and sixteen times over the simple bit splitting of FIG. 10 depending on the amount of residual fundamental. The MSB-1 disturbance energy has half the amplitude of that of FIG. 10 with much of the energy now being at the second harmonic. Thus, the MSB-1 transition disturbance energy will be a factor of between two and four times less than that of FIG. 10 depending on the amount of residual disturbance energy at the fundamental frequency. The disturbance energies of the remaining bit weight are unchanged from those of FIG. 10.

The MSB transition fundamental frequency component can be virtually eliminated by the dynamic bit splitting scheme illustrated in FIG. 13 in which dynamic sub-frame allocation has some further optimisation, but at the expense of a small increase in disturbance energy for step changes in brightness greater than one LSB.

In FIGS. 12 and 13, the peak disturbance amplitude equals the step amplitude for step changes of greater than three LSBs. This could only be reduced further by a higher level of bit splitting although this will result in a corresponding increase in the amount of data which must be loaded into the DMD array 117. The schemes of FIGS. 12 and 13 require a total of fourteen bit display intervals for the top three MSBs plus 1+R intervals for the LSBs where R is the number of remaining LSBs.

Thus comparing FIG. 7 with FIGS. 10 to 13, it can be seen that the distribution of the part sub-frames can be organised either for minimum steady state perceived display flicker as shown in FIG. 7, or for minimum bit transition "dynamic contouring" due to bit transition disturbance as shown in FIGS. 10 to 13. Unfortunately, for many bit pattern combinations, minimum flicker and minimum "dynamic contouring" do not necessarily go together, though in general bit weight distributions that give minimum "dynamic contouring" do also give useful improvements in flicker performance even though these may not be optimum. Experience shows, however, that "dynamic contouring" artefacts are generally more objectionable than flicker, as apparent flicker is generally at extremely low levels.

Figure 14:
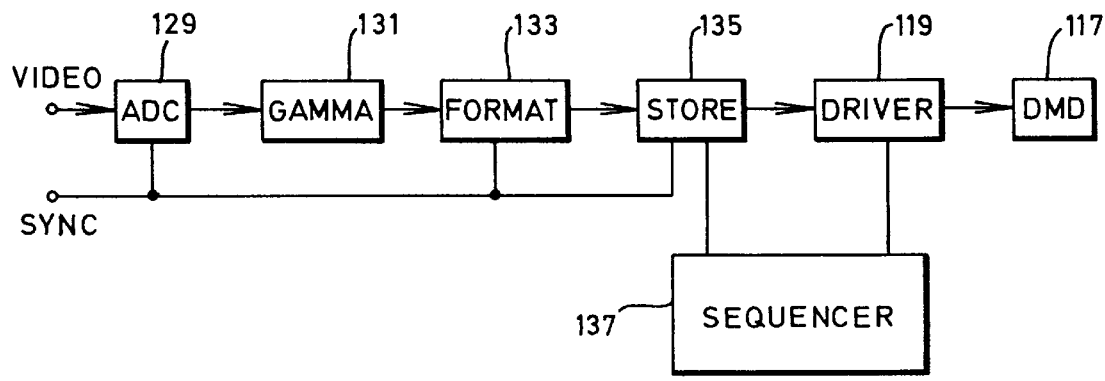
FIG. 14 illustrates part of the display system designed to implement a modified addressing system in accordance with an embodiment of the invention.
Figure 15:
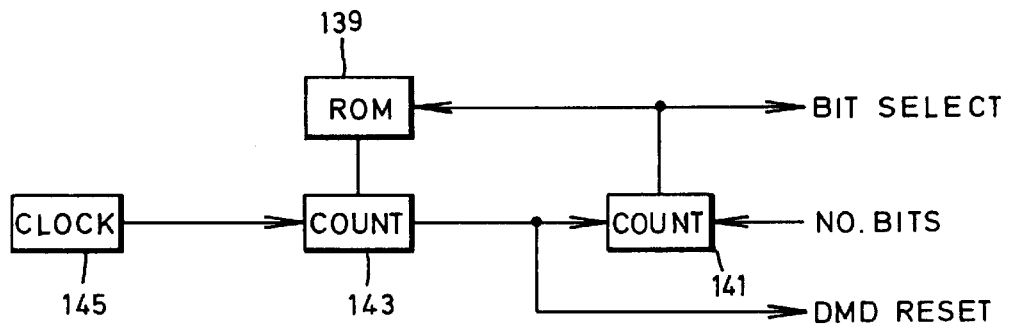
FIG. 15 illustrates the sequencer incorporated in the apparatus of FIG. 14.
Figure 16:
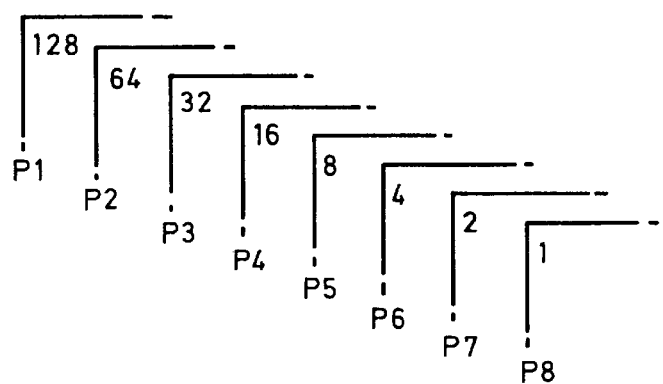
FIG. 16 illustrates the contents of the frame store incorporated in the apparatus of FIG. 14.

Referring now to FIGS. 14, 15 and 16, these figures illustrate an example of addressing circuitry for implementing modified addressing schemes in accordance with the invention. Referring firstly particularly to FIG. 14, the video input signal, which consists of one of three separate video signals representing the red, green and blue colour components of the image to be displayed, is applied to an analogue to digital converter (ADC) unit 129 together with a synchronising signal. The output of the ADC unit 129 is applied to a gamma correction unit 131 to remove the gamma correction signal which is normally present in video signals for display on a cathode ray tube.

The output of the gamma correction unit 131 is applied to a data formatting unit 133 to convert the word serial video input into a form suitable for addressing the DMD array 117. The data formatting unit 133 is arranged to address alternately two frame stores 135, of which only one is illustrated in FIG. 8. Each frame store 135 is arranged to store the video data for each element M of the DMD array 117, and to supply this data to each element M within the DMD array 117 via the driver circuit 119. The form of the frame stores 135 will be described in more detail hereafter.

A sequencer 137, whose form will be described in more detail hereafter, is arranged to supply the reset signals to the mirror devices in the DMD array 117 at the end of each bit frame display interval so as to enable all the mirror devices M to assume a 'rest' orientation as illustrated in FIG. 3 prior to being deflected into their next required orientation relative to the illuminating beam. Whilst one frame store 135 is supplying data to the DMD array 117, the other frame store 135 is receiving fresh video data from the data formatting unit 133.

Turning now particularly to FIG. 15, the sequencer 137 includes a read only memory (ROM) 139 programmed with the display time lengths of each bit field. The ROM 139 is addressed by a programmable counter 141 which is clocked by the output of a second programmable counter 143 which is, in turn, clocked by clock pulses from a clock 145. Counter 143 is programmed such that the total number of counts produced within each frame time is determined by a preset value obtained from the ROM 139. The count cycle of counter 143 thus defines the display time duration for the current bit weight, whilst counter 141 cycles through each bit display interval making up a complete display cycle. The output of counter 141 also defines the next bit weight to be transferred from the relevant frame store 135 to the DMD array 117.

At the end of each display interval, counter 143 generates an output signal which resets the DMD array 117 and transfers the new information to the mirror devices M, presets itself with next bit frame display time, and finally increments counter 141 to select the next bit weight.

Turning now particularly to FIG. 16, and assuming an 8 bit video input signal, each frame store 135 includes 8 planes P1, P2 . . . P8. Each plane holds data for DMD array 117 corresponding to a single bit weight of the input video signal. Thus, plane P1 corresponds to the MSB, plane P2 corresponds to the next most significant bit and so on up to P8 which corresponds to the LSB. The sequencer 137 provides appropriate control signals to each frame store 135 to write a single bit plane of data into the DMD array 117 ready for display during the next bit display interval. The net result is that each mirror device M of the DMD array is reset in a time multiplexed manner.

Implementation of bit display schemes in accordance with the invention, such as those shown in FIGS. 7, 10, 11, 12 and 13 is achieved by suitable programming of the sequencer ROM 139, and setting the number of bits to suit the new sequence. The distribution of the input bit weights between the additional display intervals is achieved within the gamma corrector 131 by modifying the look-up table, which is generally incorporated within the gamma corrector, to increase the output bus width.

It will be appreciated that whilst the particular display device described herebefore by way of example relates to a display device including three deformable mirror devices, the invention is equally applicable to other forms of display device including other forms of light modulators such as liquid crystal devices and also display devices which incorporate an array of switchable light sources.

It will also be appreciated that whilst in the particular embodiment described the grey scale is achieved totally by means of time division modulation of the switchable elements, the invention is also applicable to display systems in which part of the grey scale is achieved by binary modulation of the light source. Such a display system is described, for example, in the applicant's copending UK Patent Application No. GB 9223114.1 which is incorporated herein by reference.

It will also be appreciated that whilst the particular colour display system described herebefore by way of example incorporates three separate light modulators 105, 107, 109 one for each colour red, blue and green the modulators operating in parallel, the invention is equally applicable to sequential colour display systems employing a colour wheel or similar device for changing the colour of the light in a controlled manner. In such a sequential colour system, the colours are displayed sequentially from a single light modulator such that light from each colour is temporarily displaced by one third of a display frame period. Modulation temporal displacement of the light arriving at the display screen 101 will be in addition to the delays caused by the sequential colour projection. The "dynamic contouring" effect observed in prior art systems of this type will be analogous to those observed in a parallel colour system, but with colour artefacts in addition to brightness artefacts. It will be seen that an addressing scheme as described hereabove will reduce such artefacts. However, motion effects when observed in such a colour sequential system will be different from those observated in a parallel colour system, the one third of a frame period delays produced by colour sequential systems introducing colour fringing to moving objects. The worst case delay will, therefore again be half a frame period, this resulting in a similar effect to that seen in prior art parallel colour systems. Thus, display systems in accordance with the invention using, for example, an addressing system as described above can be used to alleviate this problem in sequential colour systems.

We claim:

1. A display device comprising:
   (a) an array of pixel elements each switchable between an "ON" state and an "OFF" state;
   (b) means for providing a succession of image signals each representative of successive image frames, each said image signal representing a plurality of numbers each comprising a plurality of bits, each number corresponding to a different pixel element in each image frame, each bit on each said number defining one of a plurality of different "ON" time periods for one of the pixel elements so that each number represents the total "ON" time period for a different one of the pixel elements in each image frame;
   (c) means for switching each pixel element "ON" in each image frame for time periods corresponding to said total "ON" time periods; and
   (d) means for re-ordering said "ON" time period such that the "ON" time periods for a pixel element in each image frame are in a sequence which differs from the order of the bits in the number corresponding to the pixel element, said re-ordering being such that any difference in the temporal distribution of the "ON" time periods for each pixel in successive frame intervals is less than the difference which would arise if said "ON" time periods were not re-ordered.

2. A display device according to claim 1, wherein at least one of said "ON" time periods is divided into at least two sub-periods which are temporally spaced apart from each other.

3. A display device according to claim 1, in which the means for re-ordering said "ON" time periods positions each "ON" period within the display frame period according to the change in total "ON" time for each pixel between the successive frame periods.

4. A method of addressing a display device comprising an array of pixel elements each switchable between an "ON" state and an "OFF" state comprising the steps of:
   (a) providing a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;
   (b) switching each pixel element "ON" in each image frame for time periods corresponding to said total "ON" time periods; and
   (c) re-ordering said "ON" time periods such that the "ON" time periods for a pixel element in each image frame are in a sequence which differs from the order of the bits in the number corresponding to the pixel element, said re-ordering being such that any difference in the temporal distribution of the total "ON" time periods for each pixel in successive frame intervals is less than the difference which would arise if said "ON" time periods were not re-ordered.

5. A method according to claim 4 including the step of dividing at least one of said time periods into at least two sub-periods and said step of re-ordering includes ordering said at least two sub-periods so that they are temporally spaced from each other.

6. A display system comprising:
   (a) a display device comprising an array of pixel elements each switchable between an "ON" state and an "OFF" state;
   (b) means for providing a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;

(c) means for switching each pixel element "ON" in each image frame for time periods corresponding to said total "ON" time periods;

(d) means for re-ordering said "ON" time periods such that the "ON" time periods for a pixel element in each image frame are in a sequence which differs from the order of the bits in the number corresponding to the pixel element, said re-ordering being such that any difference in the temporal distribution of the "ON" time periods for each pixel in successive frame intervals is less than the difference which would arise if said "ON" time periods were not re-ordered, and (e) a display screen, the display device being effective to project successive image frames onto the display screen.

7. A display device comprising:

(a) an array of pixel elements each switchable between an "ON" state and an "OFF" state;

(b) means for providing a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;

(c) means for switching each pixel element "ON" in each image frame for time periods corresponding to said "ON" time periods; and (d) means for dividing at least one of said plurality of different "ON" time periods into at least two sub-periods effective to switch said one pixel element "ON" during time intervals which are temporally spaced apart from each other, such that any differences in at least one of the temporal distribution between successive frame intervals and the temporal distribution between adjacent pixel elements are less than the differences which would arise if said "ON" time period was not divided.

8. A display device according to claim 7, including means for dynamically balancing said sub-periods in each display frame period.

9. A display device according to claim 7, in which said one "ON" time period corresponds to the longest time period of said "ON" time periods.

10. A method of addressing a display device comprising an array of pixel elements each switchable between an "ON" state and an "OFF" state comprising the steps of:

(a) providing a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;

(b) switching each pixel element "ON" in each image frame for time periods corresponding to said "ON" time periods; and (c) dividing at least one of said plurality of different "ON" time periods into at least two sub-periods effective to switch said one pixel element "ON" during time intervals which are temporally spaced apart from each other, such that any differences in at least one of the temporal distribution between successive frame intervals and the temporal distribution between adjacent pixel elements are less than the differences which would arise if said "ON" time period was not divided.

11. A display system comprising:

(a) a display device comprising an array of pixel elements each switchable between an "ON" state and an "OFF" state;

(b) means for providing a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;

(c) means for switching each pixel element "ON" in each image frame for time periods corresponding to said "ON" time periods;

(d) means for dividing at least one of said plurality of different "ON" time periods into at least two sub-periods effective to switch said one pixel element "ON" during time intervals which are temporally spaced apart from each other, such that any differences in at least one of the temporal distribution between successive frame intervals and the temporal distribution between adjacent pixel elements are less than the differences which would arise if said "ON" time period was not divided; and (e) a display screen, the display device being effective to project successive image frames onto the display screen.

12. A display device comprising:

(a) an array of pixel elements each switchable between an "ON" state and an "OFF" state;

(b) a signal providing circuit arranged to provide a succession of image signals each representative of successive image frames, each said image signal representing a plurality of numbers each comprising a plurality of bits, each number corresponding to a different pixel element in each image frame, each bit on each said number defining one of a plurality of different "ON" time periods for one of the pixel elements so that each number represents the total "ON" time period for a different one of the pixel elements in each image frame;

(c) a switching circuit arranged to switch each pixel element "ON" in each image frame for time periods corresponding to said total "ON" time periods; and (d) a reordering circuit arranged to re-order said "ON" time period such that the "ON" time periods for a pixel element in each image frame are in a sequence which differs from the order of the bits in the number corresponding to the pixel element, said re-ordering being such that any difference in the temporal distribution of the "ON" time periods for each pixel in successive frame intervals is less than the difference which would arise if said "ON" time periods were not re-ordered.

13. A display system comprising:
(a) a display device comprising an array of pixel elements each switchable between an "ON" state and an "OFF" state;
(b) a signal providing circuit arranged to provide a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;
(c) a switching circuit arranged to switch each pixel element "ON" in each image frame for time periods corresponding to said total "ON" time periods;
(d) a re-ordering circuit arranged to reorder said "ON" time periods for a pixel element in each image frame are in a sequence which differs from the order of the bits in the number corresponding to the pixel element, said re-ordering being such that any difference in the temporal distribution of the "ON" time periods for each pixel in successive frame intervals is less than the difference which would arise if said "ON" time periods were not re-ordered; and
(e) a display screen, the display device being effective to project successive image frames onto the display screen.

14. A display device comprising:
(a) an array of pixel elements each switchable between an "ON" state and an "OFF" state;
(b) a signal providing circuit arranged to provide a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;
(c) a switching circuit arranged to switch each pixel element "ON" in each image frame for time periods corresponding to said "ON" time periods; and
(d) a re-ordering circuit arranged to divide at least one of said plurality of different "ON" time periods into at least two sub-periods effective to switch said one pixel element "ON" during time intervals which are temporally spaced apart from each other, such that any differences in at least one of the temporal distribution between successive frame intervals and the temporal distribution between adjacent pixel elements are less than the differences which would arise if said "ON" time period was not divided.

15. A display system comprising:
(a) a display device comprising an array of pixel elements each switchable between an "ON" state and an "OFF" state;
(b) a signal providing circuit arranged to provide a succession of image signals each representative of successive image frames, each said image signal representing a plurality of numbers each comprising a plurality of bits, each number corresponding to a different pixel element in each image frame, each bit of each said number defining one of a plurality of different "ON" time periods for one of the pixel elements so that each number represents the total "ON" time period for a different one of the pixel elements in each image frame;
(c) a switching circuit arranged to switch each pixel element "ON" in each image frame for time periods corresponding to said "ON" time periods;
(d) a re-ordering circuit arranged to divide at least one of said plurality of different "ON" time periods into at least two sub-periods effective to switch said one pixel element "ON" during time intervals which are temporally spaced apart from each other, such that any differences in at least one of the temporal distribution between successive frame intervals and the temporal distribution between adjacent pixel elements are less than the differences which would arise if said "ON" time period was not divided; and
(e) a display screen, the display device being effective to project successive image frames onto the display screen.

16. A display device according to claim 1 or 7, comprising a modulated light source which is switched synchronously with the switching of the pixel elements so as to partially display grey scales.

17. A display device according to claim 1 or 7, in which the array of pixel elements is a deflectable mirror device.

18. A display device according to claim 1 or 7, in which the display device is for a parallel color display system, each pixel element being effective to direct light of one color component.

19. A display device according to claim 1 or 7, in which the display device is for a sequential color display system, each pixel element being effective to direct light of different color components sequentially.

20. A display device according to claim 1 or 7, in which said different "ON" periods are in a binary sequence.

* * * * *